(12) United States Patent
Tanaka

(10) Patent No.: US 6,172,950 B1
(45) Date of Patent: Jan. 9, 2001

(54) METHOD FOR CORRECTING TILT OF MAGNET-OPTICAL READABLE MEDIUM APPARATUS TO BE USED FOR ITS PRACTICE AND MAGNET-OPTICAL READABLE MEDIUM

(75) Inventor: Tsutomu Tanaka, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 08/992,190

(22) Filed: Dec. 17, 1997

(30) Foreign Application Priority Data

Aug. 19, 1997 (JP) ..................................... 9-222838

(51) Int. Cl.[7] ....................................... G11B 7/00
(52) U.S. Cl. .......................... 369/44.32; 369/13; 369/112
(58) Field of Search ............................. 369/44.26, 44.32, 369/44.14, 275.3, 58

(56) References Cited

U.S. PATENT DOCUMENTS 4,680,744 * 7/1987 Kanamaru ................................ 369/58
5,027,336 * 6/1991 Sugiura ............................... 369/44.32
5,321,519 * 6/1994 Akiyama .................................. 369/54
5,499,229 * 3/1996 Murakami et al. ................ 369/44.26
5,881,034 * 3/1999 Mano et al. ....................... 369/44.32
5,886,962 * 3/1999 Takamine et al. ................. 369/44.32
5,898,654 * 4/1999 Shimada et al. ........................ 369/54
5,909,413 * 6/1999 Araki ................................ 369/44.34
5,978,332 * 11/1999 Itakura et al. ..................... 369/44.32

FOREIGN PATENT DOCUMENTS 7244877    9/1995   (JP) .

* cited by examiner

*Primary Examiner*—Nabil Hindi
(74) *Attorney, Agent, or Firm*—Greer, Burns & Crain, Ltd.

(57) ABSTRACT

A tilt correction method carries out tilt correction by adjusting a magnet-optical readable medium. A tilt value is obtained by detecting crosstalk from a predetermined region of the magnet-optical readable medium, which is loaded with an apparatus to be used for practicing the tilt correction method. The tilt value is used to correct the tilt of the medium.

6 Claims, 13 Drawing Sheets

METHOD FOR CORRECTING TILT OF MAGNET-OPTICAL READABLE MEDIUM APPARATUS TO BE USED FOR ITS PRACTICE AND MAGNET-OPTICAL READABLE MEDIUM

BACKGROUND OF THE INVENTION

The present invention relates to tilt correction of a magnet-optical readable medium, and more particularly, to tilt correction method for carrying out tilt correction by detecting crosstalk, magnet-optical reproducing apparatus to be used for practicing the tilt correction method, magnet-optical recording and reproducing apparatus, and magnet-optical readable medium.

As an external memory device for a computer, a magnet-optical disk has great potential. The magnet-optical disk can drastically increase recording capacity in comparison with the flexible disk or hard disk, by forming the recording bits of submicron unit on a medium by application of an external magnetic field and irradiation of a laser beam. For example, the 3.5 inch magnet-optical disk which is at present in practical use has a track of 1.1 $\mu$m pitch provided in a radial direction and recording marks of 0.64 $\mu$m in the minimum in the circumferential direction, with a recording capacity of approximately 640 MB on one side of the disk.

In order to record further enormous the data amount on such magnet-optical disks and make it possible to record motion images, it is necessary to increase further the recording capacity, i.e., recording density. Thus, it is necessary to shorten the recording mark length and shorten the distance between marks. For that purpose, the wavelength of the laser beam to be irradiated may be shortened, but there has been a problem of lowering the reading signal level. To cope with this problem, there has been proposed a magnetically induced super resolution (MSR) technique to read recording marks smaller in size than the spot diameter by utilizing the temperature distribution in the spot region of the laser beam.

Various MSR media proposed have had problematic points such that a large initializing magnet is required, or though the initializing magnet is not required, the crosstalk is high, or the reading signal level is low, and the like. In this connection, the present applicant proposed in Japanese Patent Application Laid-Open No. 7-244877(1995) an MSR medium with which a transcription region can be formed in a spot by application of low magnetic field, by providing an intermediate layer having specified magnetization characteristics between the reading layer and the recording layer. This MSR medium has resolved the defects of other MSR medium in that it does not necessitate a initialization magnet, it is effective for crosstalk, and can give high reading signal level.

By the way, in recording or reproducing information on a magnet-optical disk, the light beam is irradiated on the magnet-optical disk loaded with an apparatus and the magnetic field is applied. At this time, when the inclination of the magnet-optical disk relative to the light beam (hereinafter to be called tilt) is deviated from a perpendicular line under the loaded state, the recording signal may not be accurately recorded or accurate reading signal may not be obtained. For example, in case of reading the MSR medium proposed by the present applicant as described above, in case a tilt is formed, the temperature distribution in the laser beam spots shows change from the normal state to cause a change in the configuration of the transcription region in the spot. As a result, there has been a problem that the reading signal cannot be obtained in sufficient amplitude.

Furthermore, in the recording of the MSR medium as mentioned above, in case of the formation of tilt, the laser beam power is required to be elevated so as to focus the laser beam, thereby narrowing the recording power margin and providing no practical result.

BRIEF SUMMARY OF THE INVENTION

The present invention has been made to solve the problematic points mentioned above. An object of the present invention is to provide a tilt correction method and apparatus for carrying out tilt correction of a magnet-optical readable medium loaded with an apparatus by detecting crosstalk from the predetermined region of the magnet-optical readable medium. Another object of the present invention is to provide a magnet-optical readable medium having record of the program code means for correcting tilt, and a magnet-optical readable medium having the region for detecting the above crosstalk.

The tilt correction method of the magnet-optical readable medium of the present invention is characterized by having a step of detecting the loading of the magnet-optical readable medium on the reproducing apparatus, a step of applying a magnetic field to the magnet-optical readable medium while irradiating said light beam to read out the predetermined region of said magnet-optical readable medium, a step of detecting the crosstalk of said predetermined region, a step of obtaining the tilt value of said magnet-optical readable medium based on said crosstalk, and a step of correcting the tilt of said magnet-optical readable medium according to the obtained tilt value.

Accordingly, since the tilt value when the magnet-optical readable medium is loaded is detected and the tilt is corrected when correction is necessary, and the actions of recording, reproducing, etc. are exerted to the magnet-optical readable medium after correction, accurate recording and reproducing can be performed. The tilt value of the loaded magnet-optical readable medium can be obtained for example by reading the region for detecting the crosstalk provided on the magnet-optical readable medium and detecting the crosstalk from the reading signal.

With tilt correction method according to the present invention, the magnet-optical readable medium permits reading from the transcription region smaller than the spot diameter of said light beam, and said magnetic field has a polarity in which the transcription region becomes broader in the track width direction of said magnet-optical readable medium in reading said predetermined region.

This is a method for applying a tilt correction to the MSR medium according to the proposal of the applicant of the present application. This MSR medium shows remarkably different crosstalk values depending on the polarity of the reproducing magnetic field, as shown in the later described FIG. 7. This is due to the difference of the configuration of the transcription region. When the transcription region has such configuration as to become broader in the track width direction, the crosstalk value becomes larger. Accordingly, when reproducing for correcting the tilt of the medium, by applying a magnetic field of the polarity in which the crosstalk value becomes larger, the tilt value can be accurately obtained.

The magnet-optical reproducing apparatus according to the present invention comprises a loading part to which the magnet-optical readable medium is loaded, a detecting part for detecting the loading of said magnet-optical readable medium to said loading part, an optical head for receiving the reflected light of a light beam irradiated on the magnet-optical readable medium and converting it to an electric signal, a tilt correction operating circuit for generating a crosstalk detecting signal from the electric signal of said optical head in response to the detection of said detecting part, a crosstalk detecting circuit for detecting the crosstalk from said crosstalk detecting signal, a tilt value calculating circuit for obtaining the tilt value of the magnet-optical readable medium based on the detected crosstalk, and a tilt correction part for correcting the tilt of the magnet-optical readable medium based on said tilt value.

Accordingly, the tilt value when the magnet-optical readable medium is loaded on the loading part is calculated by the tilt value calculating circuit, and when correction is necessary, the tilt is corrected by said tilt correcting part. Since the operations of recording, reproducing, etc. are given to the magnet-optical readable medium after correction of the tilt, correct recording and reproducing can be performed. The tilt value of the amounted magnet-optical readable medium is obtained by reproducing, for example, the region for detecting the crosstalk provided on the magnet-optical readable medium by the optical head, and detecting the crosstalk from the reading signal.

Furthermore, the magnet-optical reproducing apparatus of the present invention may include a tilt correction part which is a three-dimensional moving apparatus fit with said loading part for changing the inclination of said magnet-optical readable medium relating to said optical head.

Furthermore, the magnet-optical reproducing apparatus of the present invention may have a loading part which has a convex surface on one side. The tilt correction part can be a stage having a concave surface which can be engaged with the convex surface of said loading part, and it may be fitted to said loading part to move in the three-dimensional direction according to the tilt value calculated by said tilt value calculating circuit.

Accordingly, based on the calculation results of the tilt value by said tilt value calculating circuit, the inclination of the loading part in the three-dimensional direction is adjusted, and correction is made so that the light beam is incident on the magnet-optical readable medium in approximately a perpendicular direction.

Also, the magnet-optical reproducing apparatus of the present invention can include a tilt correction part which is a three-dimensional moving apparatus loaded with said optical head and adapted to change the inclination of said optical head to said magnet-optical readable medium.

Accordingly, based on the calculation results of the tilt value by said tilt value calculating circuit, the inclination of said optical head is adjusted to correct so that the light beam is incident on the magnet-optical readable medium approximately perpendicularly.

Furthermore, the magnet-optical recording and reproducing apparatus of the present invention which is adopted to apply the respective magnetic fields controlled by the magnetic field controlling part with the magnetic field applying apparatus in the recording, reproducing, and erasing of the information of magnet-optical readable medium further includes a loading part on which the magnet-optical readable medium is loaded, a detection part for detecting the loading of the magnet-optical readable medium on said loading part and instructing the tilt correction and a tilt correction part for correcting the tilt of said magnet-optical readable medium, in which said magnetic field control part controls the magnetic field to be applied to said magnet-optical readable medium when said tilt correction is instructed.

Accordingly, said magnetic field control part controls the magnetic field to be applied in the tilt correction in addition to the recording, reproducing, and erasing time of the information, and gives the control signal to the magnetic field application apparatus, so that it can apply a magnetic field which is easy to detect the crosstalk.

Also, the magnet-optical recording and reproducing apparatus according to the present invention is characterized in that a permanent magnet is used for the magnetic field application apparatus.

Accordingly, the absolute values of the respective magnetic fields in recording, erasing, reproducing and tilt correction to be applied to the magnet-optical readable medium are identical, and application can be made by changing the positive and negative polarities by rotating the permanent magnet. As it is possible to use a permanent magnet, power consumption can be reduced.

Furthermore, a computer memory product according to the present invention is characterized by having a first program coding means for reproducing the predetermined region of said magnet-optical readable medium on receipt of instructing the tilt correction, a second program coding means for detecting the crosstalk by the reading signal obtained from said predetermined region, a third program coding means for obtaining the tilt value of said magnet-optical readable medium based on said crosstalk, and a fourth program coding means for transmitting the tilt correction amount of said magnet-optical readable medium to a tilt correction part according to the obtained tilt value.

Accordingly, since the program for instructing the tilt correction to the computer is recorded on the magnet-optical readable medium, the tilt correction can be made just by adding a function of moving the inclination of the magnet-optical readable medium to a normal magnet-optical reproducing apparatus, for example, by recording the data peculiar to said magnet-optical readable medium such as the thickness data of magnet-optical readable medium, the data representing the relations between the crosstalk and the tilt value.

Furthermore, the magnet-optical readable medium according to the present invention is characterized by being provided with crosstalk detecting regions in which said recording marks are formed for obtaining the tilt value by detecting the crosstalk, on at least three adjacent tracks.

Accordingly, by reproducing the tracks on both sides of the three tracks and comparing the respective reading signals, the differences of the crosstalks from that of the central track are detected. By the crosstalk differences, the tilt value of the magnet-optical readable medium can be obtained.

The above and further objects and features of the invention will more fully be apparent from the following detailed description with accompanying drawings.

DETAILED DESCRIPTION OF THE INVENTION

Hereinafter, the present invention is concretely described on the basis of the drawings which show the embodiments thereof.

Figure 1:
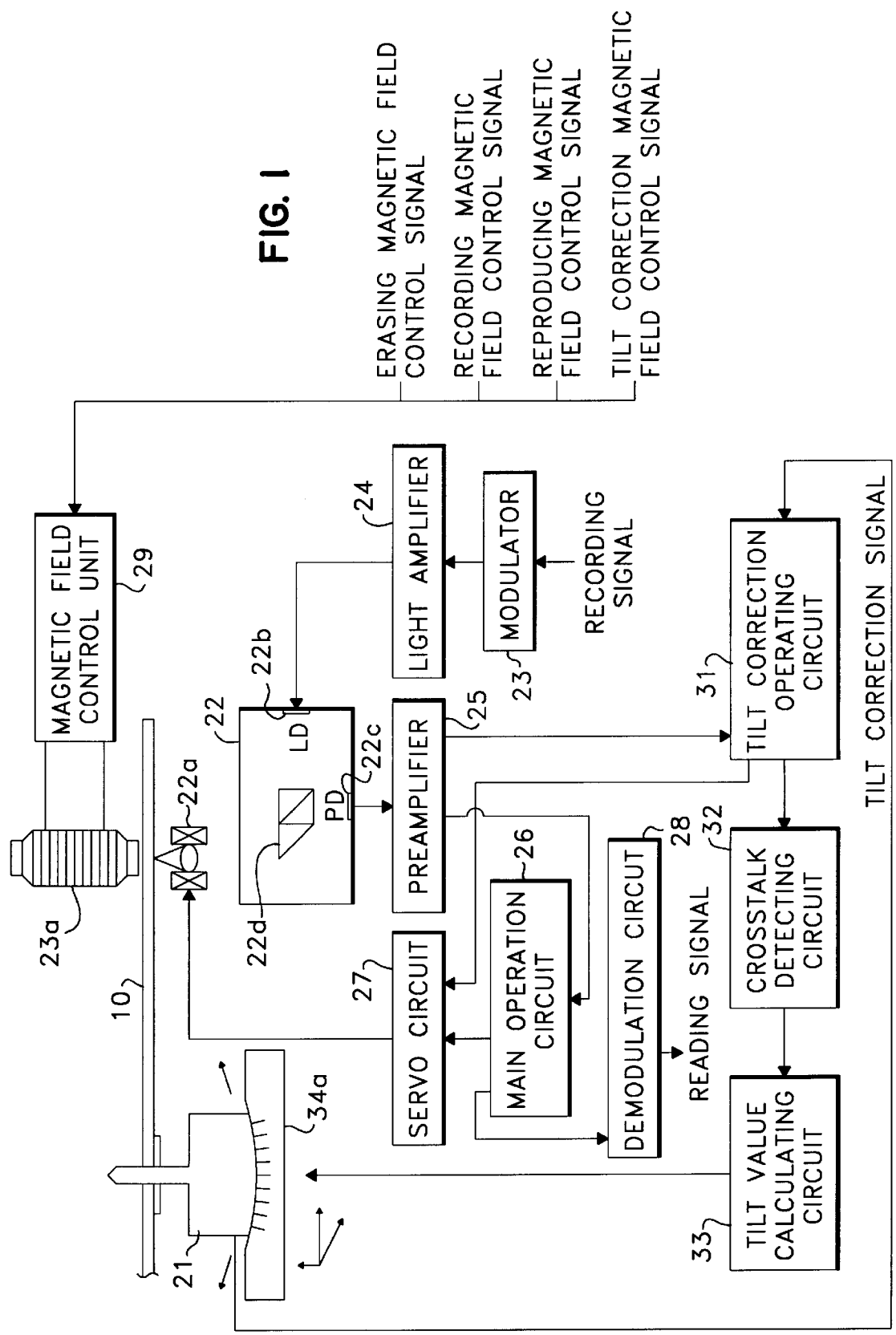
FIG. 1 is a block diagram showing the constitution of the magnet-optical recording and reproducing apparatus according to an embodiment of the present invention.
Figure 2:
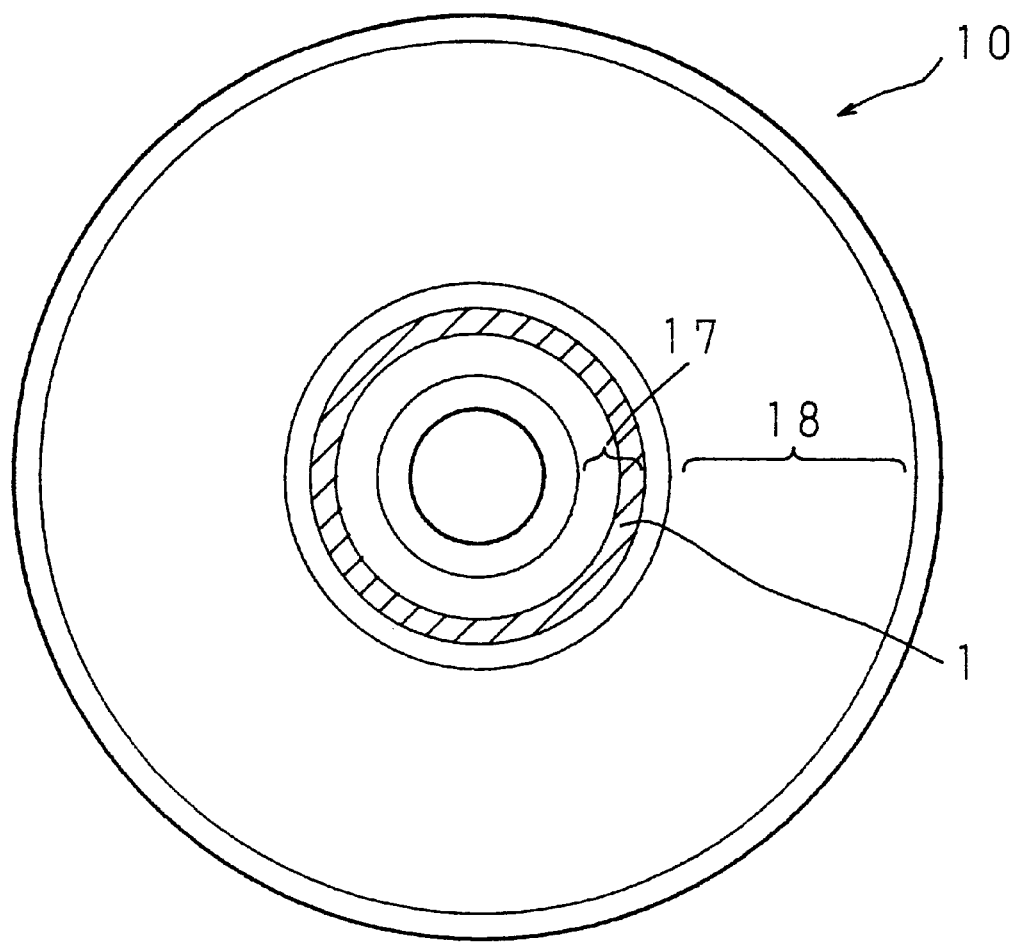
FIG. 2 is a plan view of the magnet-optical disk of the present invention.
Figure 3:
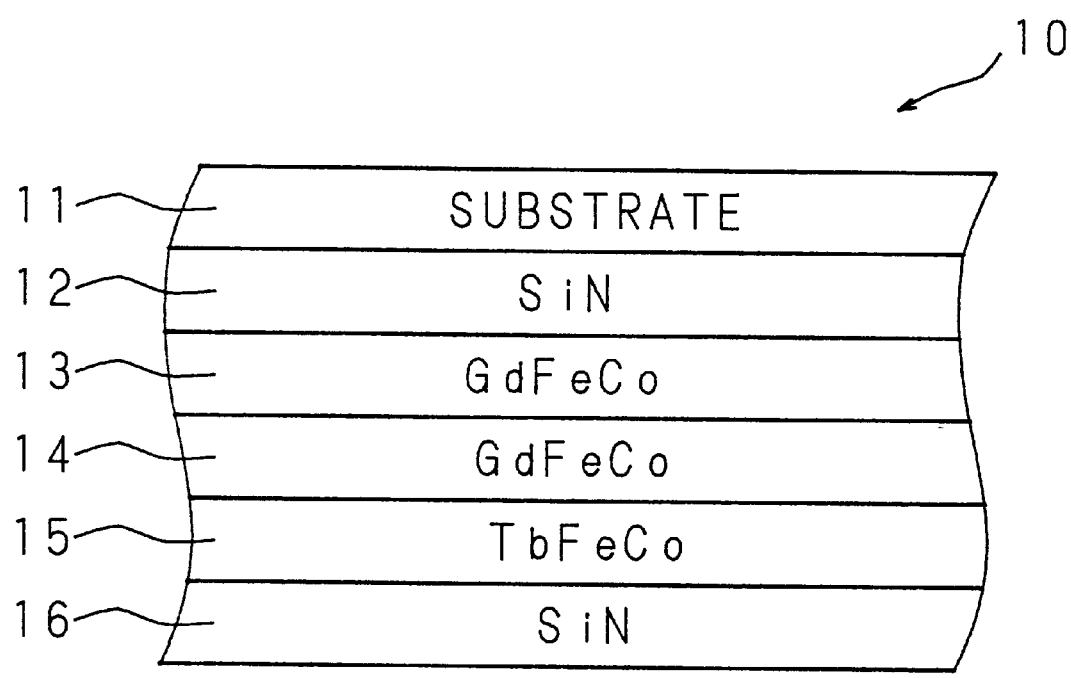
FIG. 3 is a sectional view showing the film constitution of the magnet-optical disk shown in FIG. 2.

FIG. 1 is a block diagram showing the constitution of the magnet-optical recording and reproducing apparatus according to an embodiment of the present invention. As shown in the figure, the magnet-optical disk 10 is loaded with the spindle 21 which is the loading part and the load detection part, and the spindle 21 is placed on the three dimensional moving table 34a which is the tilt correction part. By the movement of the three dimensional table 34a, inclination of the spindle 21 relative to the magnet-optical disk 10 is adjustable. FIG. 2 is a plan view of the magnet-optical disk 10, and FIG. 3 is a sectional view showing the film constitution of the magnet-optical disk 10. As shown in FIG. 2 and FIG. 3, the magnet-optical disk 10 is constituted by laminating a dielectric film 12 made of SiN, reading layer 13 made of GdFeCo, an intermediate layer 14 made of CdFeCo, a recording layer 15 made of TbFeCo, a dielectric film 16 made of SiN and protective coating layer (not illustrated) in this order on a disk shaped polycarbonate substrate 11. The polycarbonate substrate 11 is formed with the land and group width of 0.7 $\mu$m pitch. The composition, film thickness, Curie temperature and dominant of each layer are shown in TABLE 1, and the manufacturing conditions by DC sputtering method including the sputter gas, sputter pressure, etc. are shown in TABLE 2.

Figure 4:
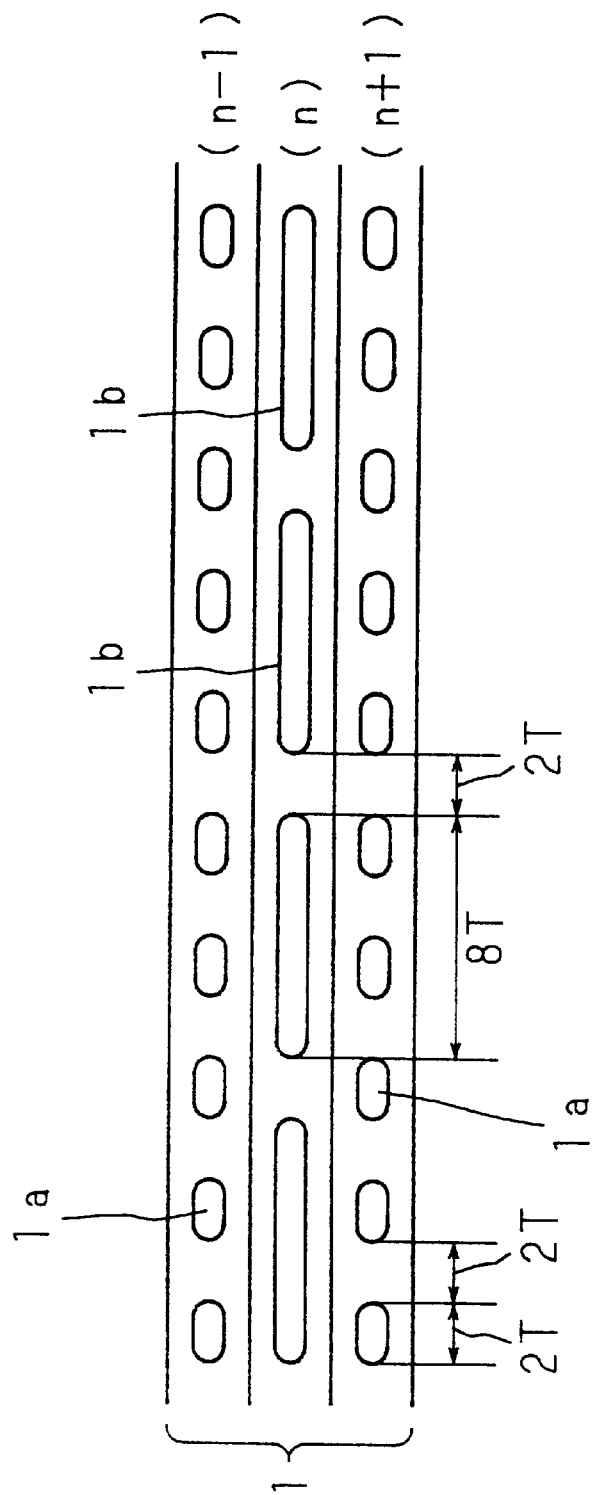
FIG. 4 is an enlarged view of the crosstalk detection region of the magnet-optical disk shown in FIG. 2.

As shown in FIG. 2, the magnet-optical disk 10 has a control track region 17 and a data recording region 18 in order from the central side, and a crosstalk detection region 1 is provided in the control track region 17. FIG. 4 is an enlarged view of the crosstalk detection region 1, showing three tracks of track (n−1), track n, and track (n+1). On the central track n of the three tracks, the record marks 1b of 8T mark and 2T space are formed, and on the tracks on both sides (n−1), track (n+1), there are formed the 2T repetition recording marks 1a, respectively. These recording marks are all recorded on the same conditions, i.e., the peripheral speed of the magnet-optical disk 10 to be 6 m/s, the power of the recording laser beam to be 7.0 mW, the recording frequency 7.5 MHz, and luminous duty 50.0%, and formed by application of positive magnetic field.

On the upper and lower parts of the magnet-optical disk 10 having the constitution as above, at the mutually opposite positions there are disposed an electromagnet 23a and an optical head 22. The optical head 22 is provided with a laser diode (LD) 22b for emitting laser beam, an actuator 22a for controlling the irradiating position of the laser beam to the magnet-optical disk 10, an optical system 22d for converging the emitted laser beam and forming the optical path of the reflection light reflected on the magnet-optical disk 10, and a photodiode (PD) 22c for receiving the reflected light and converting it to an electric signal. The wavelength of the laser beam is 685 nm, and NA of objective lens is 0.55.

As shown in FIG. 1, according to the recording system of this apparatus, the recording signal is inputted to the modulator 23 and modulated to a signal to be recorded on the magnet-optical disk and inputted to the light amplifier 24. The signal amplified by the light amplifier 24 is inputted to the LD 22b, and the laser beam having power for recording is emitted. The emitted laser light is passed through the optical system 22d and irradiated on the magnet-optical disk 10, and a recording mark is formed on the magnet-optical disk 10.

Also, in the reading system, the laser beam having power for reading emitted from the LD22b is reflected on the magnet-optical disk 10, and the reflected light is passed through the optical system 22d and received by the PD22c. The signal converted with PD22c is inputted to the preamplifier 25, amplified and outputted to the main operating circuit 26. The magnet-optical signal and each servo signal are operated in the main operating circuit 26, and they are respectively outputted to the demodulation circuit 28 and servo circuit 27. The servo circuit 27 inputs the inputted servo signal to the actuator 22a and controls the position of the actuator 22a. On the other hand, the magnet-optical signal inputted to the demodulation circuit 28 is demodulated and outputted as a reading signal.

And, in the tilt correction system which is a characteristic feature of the present invention, when the magnet-optical disk 10 is loaded with the spindle 21, the tilt correction signal is inputted to the tilt correction operating circuit 31. The tilt correction operating circuit 31 gives instructions to the servo circuit 27 to move the actuator 22a to a position above the crosstalk detection region 1 of the magnet-optical disk 10. The signal which has reproduced the crosstalk detection region 1 is inputted to the tilt correction operating circuit 31 from the preamplifier 25. In the tilt correction operating circuit 31 the inputted signal is operated and each servo signal is outputted to the servo circuit 27, and the magnet-optical signal to the crosstalk detecting circuit 32 as a crosstalk detecting signal. In the crosstalk detecting circuit 32 the crosstalk is detected from the first and second detecting signals and outputted to the tilt value calculating circuit 33. The tilt value calculating circuit 33 calculates the tilt value based on the detected crosstalk, and inputs the tilt value to the three dimensional movement table 34a. The three dimensional movement table 34a moves to correct the tilt of the spindle 21 according to the inputted tilt value signal.

In the respective motions in erasing, tilt correcting, recording, and reproducing, the electromagnet 23a applies the magnetic field to the magnet-optical disk 10 according to the signal inputted from the magnetic field controlling part 29. To the magnetic field controlling part 29 is inputted a recording magnetic field control signal in recording on the magnet-optical disk 10, a reproducing magnetic field control signal in the reading, an erasing magnetic field control signal in the erasing, and a tilt correction magnetic field control signal in the tilt correction, so as to give the magnetic field signal to be applied to the magnet-optical disk 10 to the electromagnet 23a according to the respective control signals.

Figure 5:
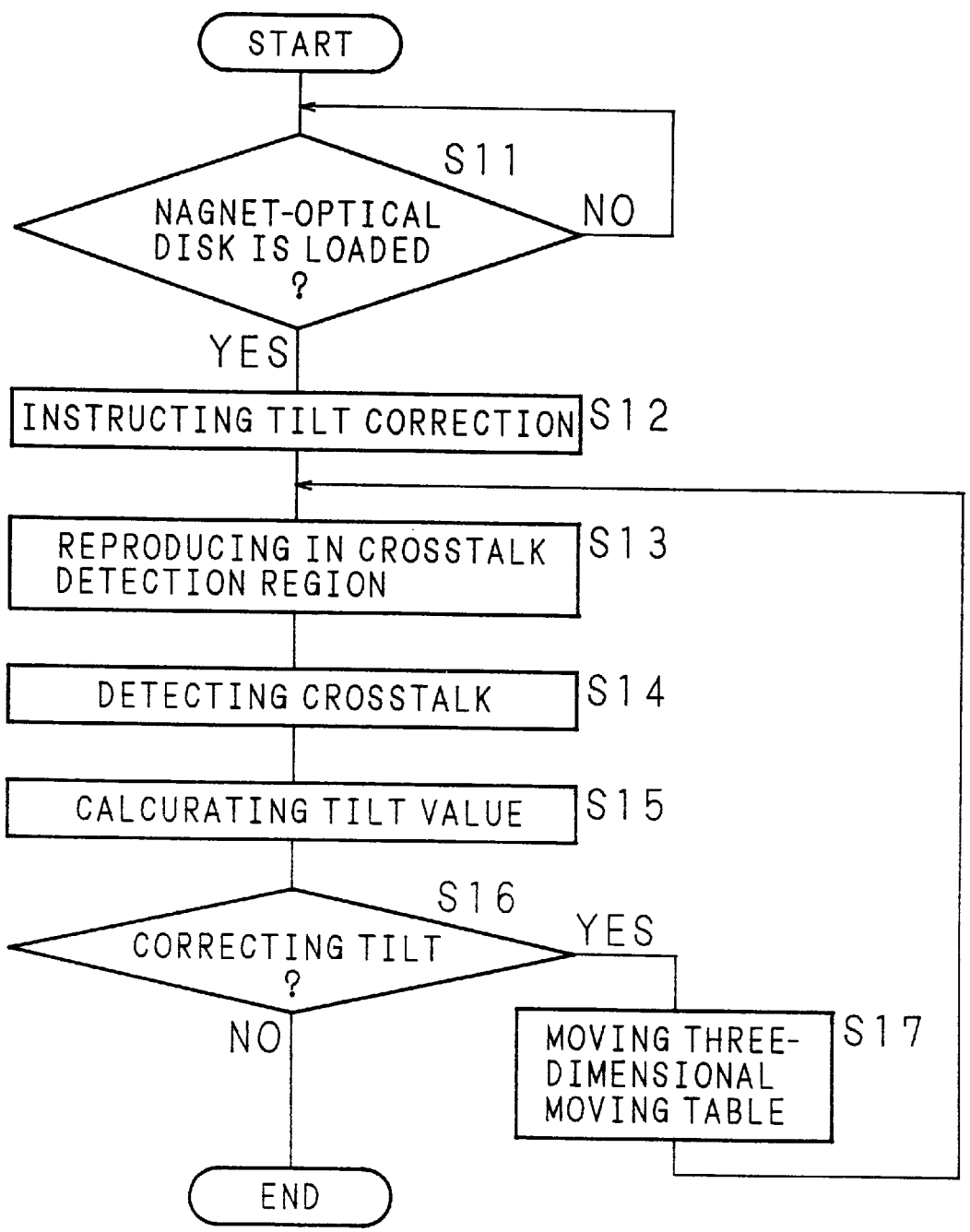
FIG. 5 is a flow chart showing the procedures for the tilt correction of the present invention.

The case of carrying out the tilt correction of the magnet-optical disk 10 by using the magnet-optical recording and reproducing apparatus of the above constitution is explained below. FIG. 5 is a flow chart to show the procedures of the tilt correction of the magnet-optical disk 10. As shown in FIG. 5, in recording or reproducing the information on the magnet-optical disk 10, the magnet-optical disk 10 is loaded with the spindle 21 (Step S11), loading is detected to give instruction on tilt correction to the tilt correction operating circuit 31 and magnetic field control part 29 (Step S12), and in the crosstalk detection region 1 the reading is carried out (Step S13).

Figure 6:
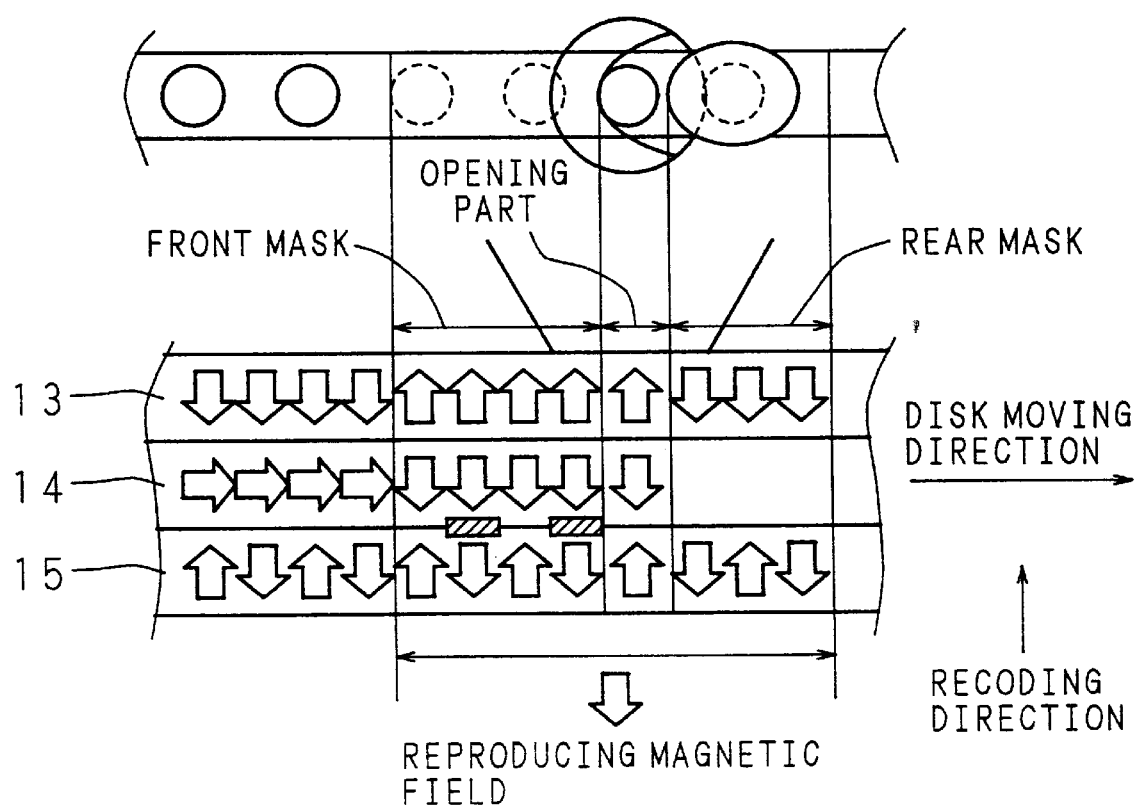
FIG. 6 is a view showing the magnetization condition of the magnet-optical disk shown in FIG. 3 during the reproducing.

In reproducing of the crosstalk detection region 1, the tilt correction operating circuit 31, on receipt of the tilt correction signal, causes the servo circuit 27 to move on the crosstalk detection region 1 of the magnet-optical disk 10. By the LD 22b, the laser beam for reproducing is emitted to irradiate on the track (n−1) of the crosstalk detection region 1, followed by irradiating the track (n+1). On the other hand, the magnetic field control part 29 controls the electromagnet 23a so as to apply the tilt correction magnetic field in response to the tilt correction magnetic field control signal. And, the reflected light on the crosstalk detection region 1 is incident on the PD 22c and converted to the crosstalk detecting signal in the tile correction operating circuit 31. FIG. 6 is a view to show the magnetizing condition of the magnet-optical disk 10 in the reproducing. As described above, the magnet-optical disk 10 has a recording mark by application of the positive magnetic field. Hereinafter, the positive magnetic field is called the magnetic field in the recording direction, and the negative magnetic field the magnetic field in the erasing direction.

As shown in FIG. 6, in the region of the front mask, i.e., in the low-temperature region, the exchange coupling force between the recording layer 15 and the intermediate layer 14 is in cut condition, and the intermediate layer 14 is arrayed in the direction of the reproducing magnetic field. In the rear mask region, i.e., in the high-temperature region, the exchange coupling force between the reading layer 13 and the intermediate layer 14 is in cut condition, and the reading layer 13 is arrayed in the direction of the reproducing magnetic field. And, in the opening part, i.e., the intermediate-temperature region which is a region smaller than the spot diameter of the laser beam, the magnetization direction of the recording layer 15 is transcribed to the reading layer 13 by the exchange coupling of each layer, and the recording mark is read out from said transcription region. The applicant of the present invention gave explanation on the manufacturing process, reproducing principle, and magnetizing condition in reproducing about the double mask MSR medium similar to the magnet-optical disk 10 in the publication of Japanese Patent Application Laid-Open No. 7-244877 (1995), and detailed explanation thereof is omitted here.

Figure 7:
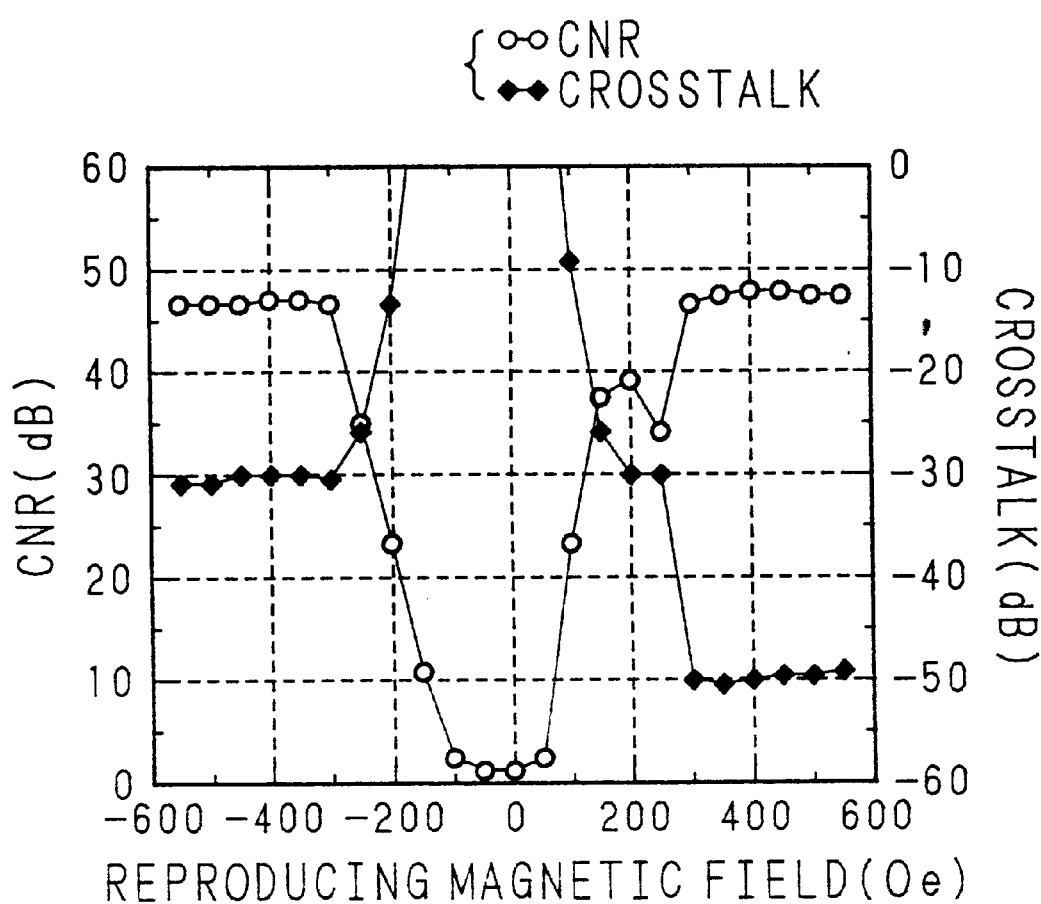
FIG. 7 is a graph showing the CN ratio and the crosstalk of the magnet-optical disk shown in FIG. 3 relative to the reproducing magnetic field.

FIG. 7 is a graph showing the CN ratio of the magnet-optical disk to the reproducing magnetic field and the crosstalk. The recording mark of the magnet-optical disk 10 is read with the laser beam power for reproducing at 3 mW. As apparent from FIG. 7, sufficient CN ratio is obtainable with 350 Oe and higher in the recording direction, and with 300 Oe and higher in the erasing direction. With respect to the crosstalk, in case of an application of a magnetic field in the recording direction, −50 dB in the minimum is obtainable, and in case of the application in the erasing direction, −30 dB in the minimum is obtainable. The crosstalk is detected in the larger amount in case of the application of the magnetic field in the recording direction. From this result, it is known that, for the purpose of detecting the crosstalk, the application of magnetic field in the erasing direction is advantageous.

In the above manner, in the Step S13 the crosstalk detection region 1 is reproduced, and the crosstalk detecting signal is inputted to the crosstalk detecting circuit 32. In the crosstalk detecting circuit 32, comparison is made between the first crosstalk detecting signal which is a reading signal of the track (n−1) and the second crosstalk detecting signal which is a reading signal of the track (n+1), and the crosstalk is detected (Step S14). And, the detection results are given to the tilt value calculating circuit 33 and the tilt value is calculated (Step S15).

Figure 8:
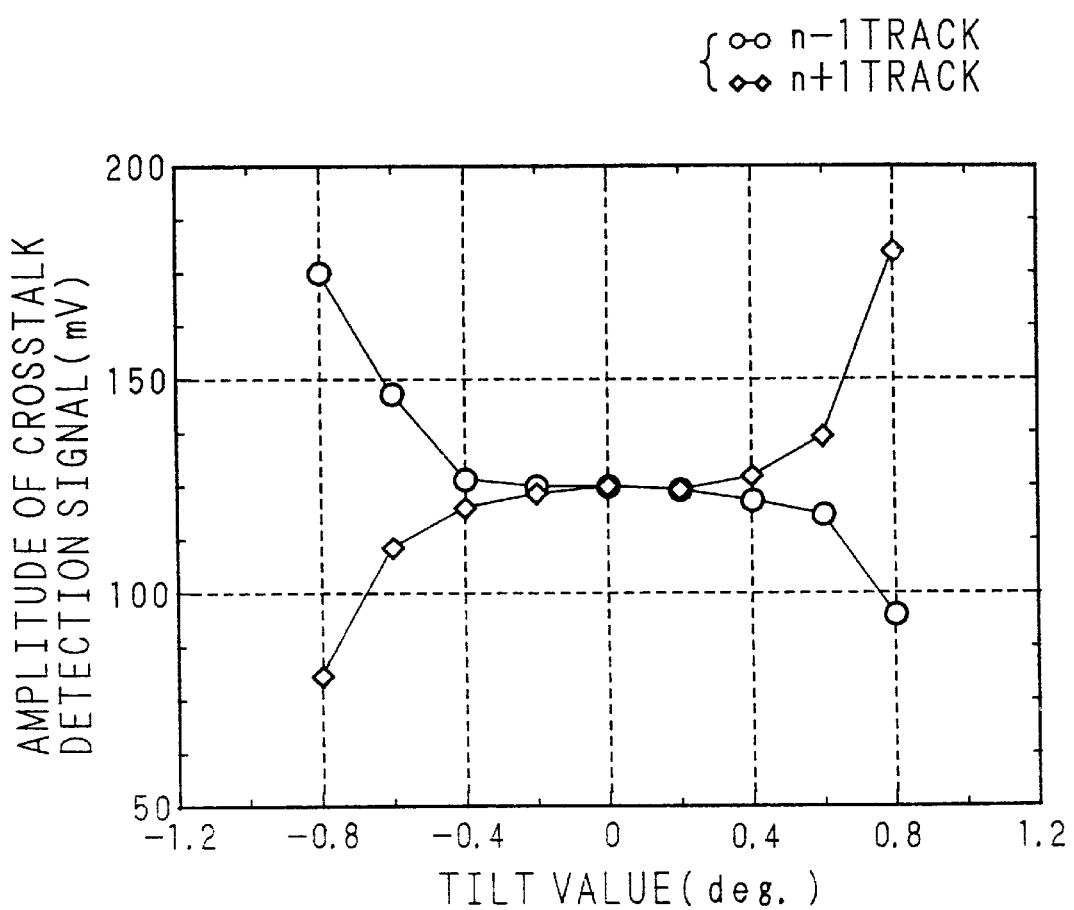
FIG. 8 is a graph showing the relations between the reading signal amplitude and the tilt value in this embodiment.

FIG. 8 is a graph showing the relation between the amplitude of the crosstalk detecting signal and the tilt value. For example, in case the amplitude of the first crosstalk detecting signal is 175 mV and the amplitude of the second crosstalk detecting signal is 80 mV, the tilt value of the magnet-optical disk 10 is −0.8 deg. This shows that, based on the reference condition where the laser beam is perpendicularly irradiated to be zero, the track (n−1) side is inclined in the direction to be above the track (n+1) by 0.8 deg. Also, in case the amplitudes of the first and second crosstalk detecting signals are approximately the same value, the tilt value is approximately zero, which is indicative that the laser beam is in a state of being perpendicularly irradiated on the magnet-optical disk 10. The relation between the amplitude of the crosstalk detecting signal and the tilt value is different depending on the film composition of the magnet-optical disk, and the value of experience depending on the magnet-optical disk is given to the tilt value calculating circuit 33.

The tilt value calculating circuit 33 judges whether to make correction of the tilt or not, depending on the calculation result (Step S16). In case the tilt value is in the range of for example ±0.2 deg., the tilt correction is terminated without making tilt correction. And, in case the tilt value is outside the range of ±0.2 deg., the inclination of the spindle 21 is adjusted by the three-dimensional moving table 34a to carry out tilt correction (Step S17). After the tilt correction, the crosstalk detection region is again reproduced (Step S13) to calculate the tilt value (Step S15), and completion of correction of the tilt is confirmed. This step is repeated until the tilt is completely corrected.

Figure 9:
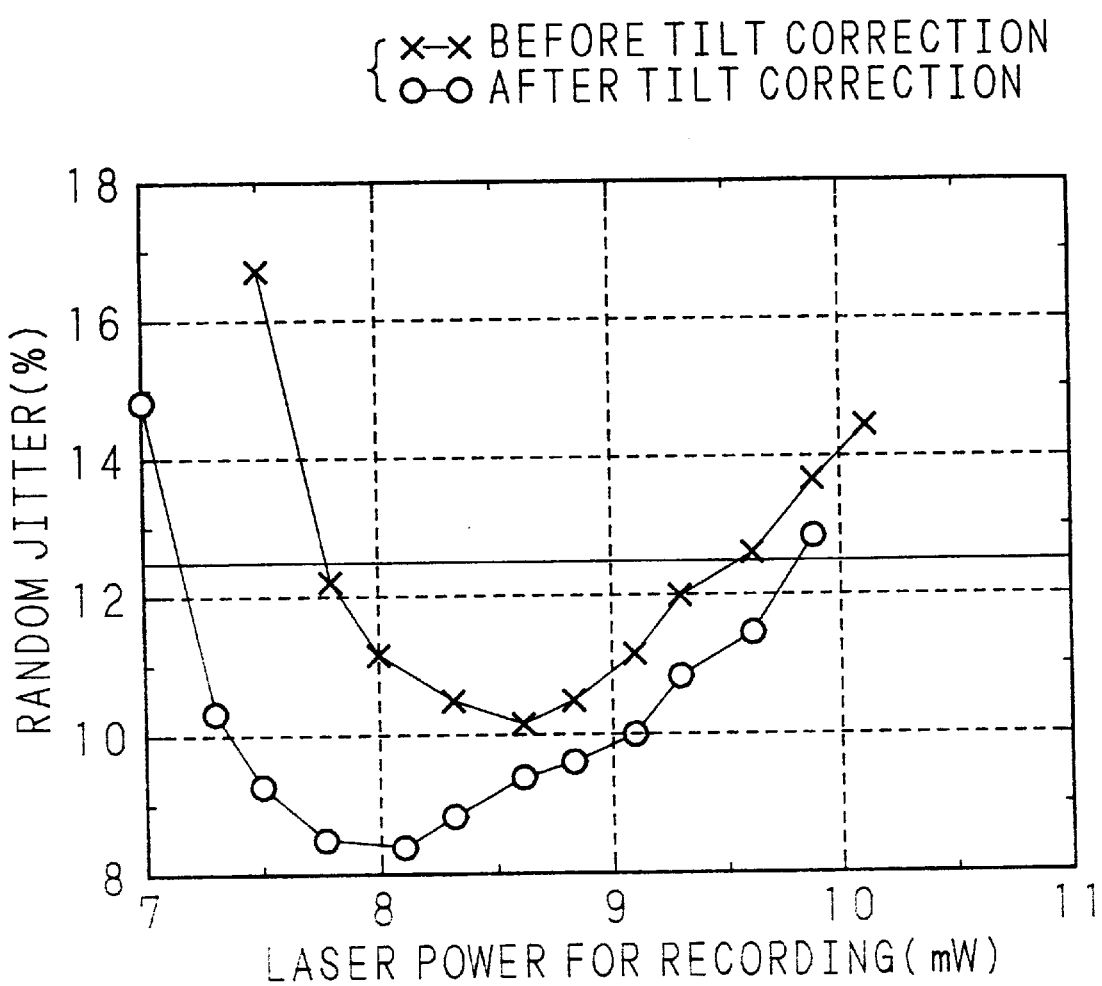
FIG. 9 is a graph showing the jitter relative to the laser power for recording prior to and after amendment of the tilt.
Figure 10:
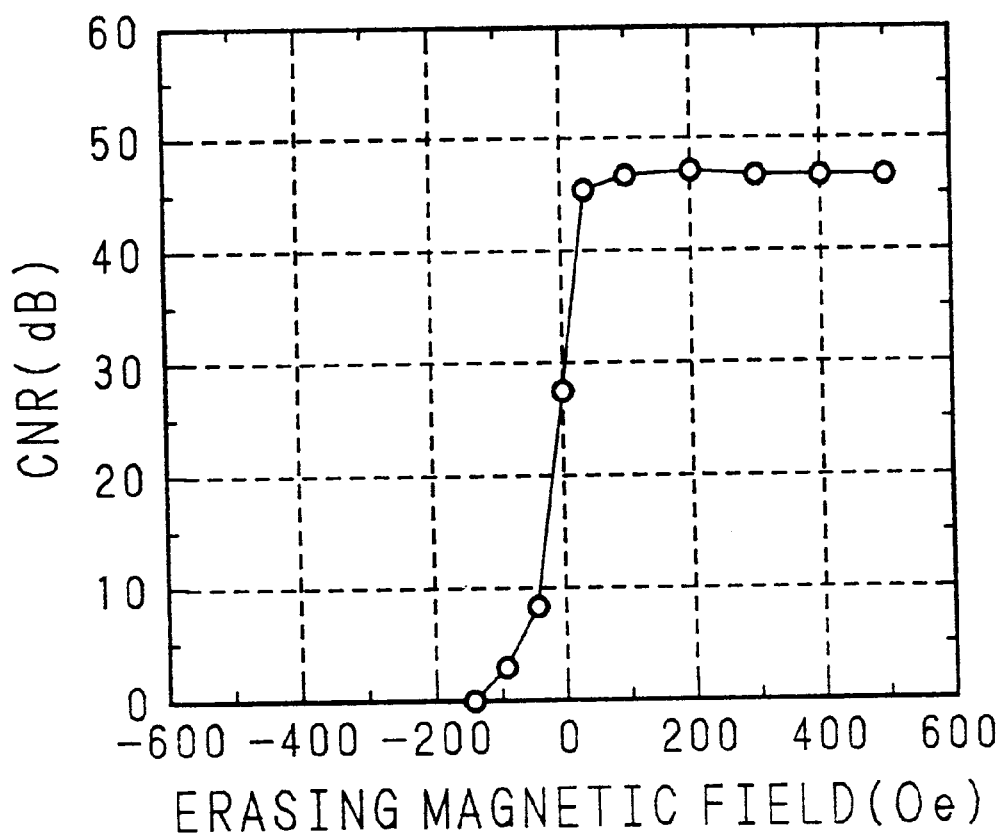
FIG. 10 is a graph showing the CN ratio of the magnet-optical disk shown in FIG. 3 relative to the erased magnetic field.
Figure 11:
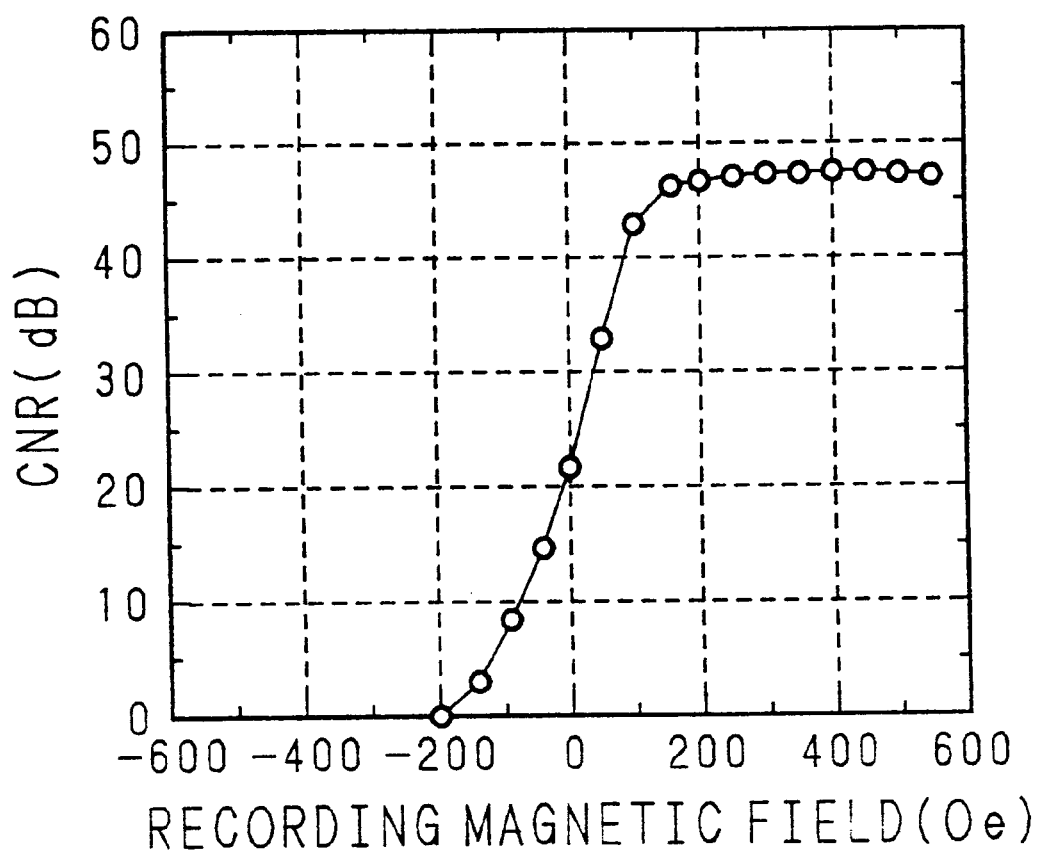
FIG. 11 is a graph showing the CN ratio of the magnet-optical disk shown in FIG. 3 to the recording magnetic field.

The recording characteristics of the magnet-optical disk 10 which has been subjected to tilt correction as above is examined. FIG. 9 is a graph showing the results of measurements of the recorded power margins before and after the tilt correction, respectively. As apparent from FIG. 9, the laser power range in which the random jitter is no more than 13% is wider in the magnet-optical disk after the tilt correction. Against the recording power margin of ±10% in the state prior to the tilt correction (5 mrad), the recording power margin after the tilt correction is improved to ±15%. In this manner, by carrying out tilt correction in loading the magnet-optical disk 10 on the apparatus, the recording power margin is expanded, and the reproduction signal can be obtained in large amplitude, Also, the erasing characteristics of the above magnet-optical disk 10 are examined. Erasing is made with the laser beam power for erasing of 8 mW. FIG. 10 is a graph showing the ratio of CN relative to the erasing magnetic field. As apparent from the graph, it can be seen that the recording mark is fully erased with the erasing magnetic field of 150 Oe and higher in the erasing direction. Also, the recording characteristics of the magnet-optical disk 10 is examined. Recording is made with the laser beam power for recording of 7.0 mW. FIG. 11 is a graph showing the ratio of CN relative to the recording magnetic field. As apparent from the graph, it can be observed that the recording is possible with 200 Oe or more of the recording magnetic field in the recording direction. Furthermore, as apparent from FIG. 7 above, during the reproducing of information, the reproduction is possible with 350 Oe or more in the recording direction, and in case of the tilt correction, detection of crosstalk with 300 Oe or more in the erasing direction is advantageous.

As described above, in the magnet-optical recording and reproducing apparatus of this embodiment, in case of the tilt correction, the tilt correction control signal is inputted, in case of the recording, the recording control signal is inputted, in erasing, the erasing correction signal is inputted, in reproducing, the reading control signal is inputted, respectively to the magnetic field control part 29, and the magnetic field control part 29 controls the magnetic field application apparatus so as to apply the respective proper magnetic field.

Figure 12:
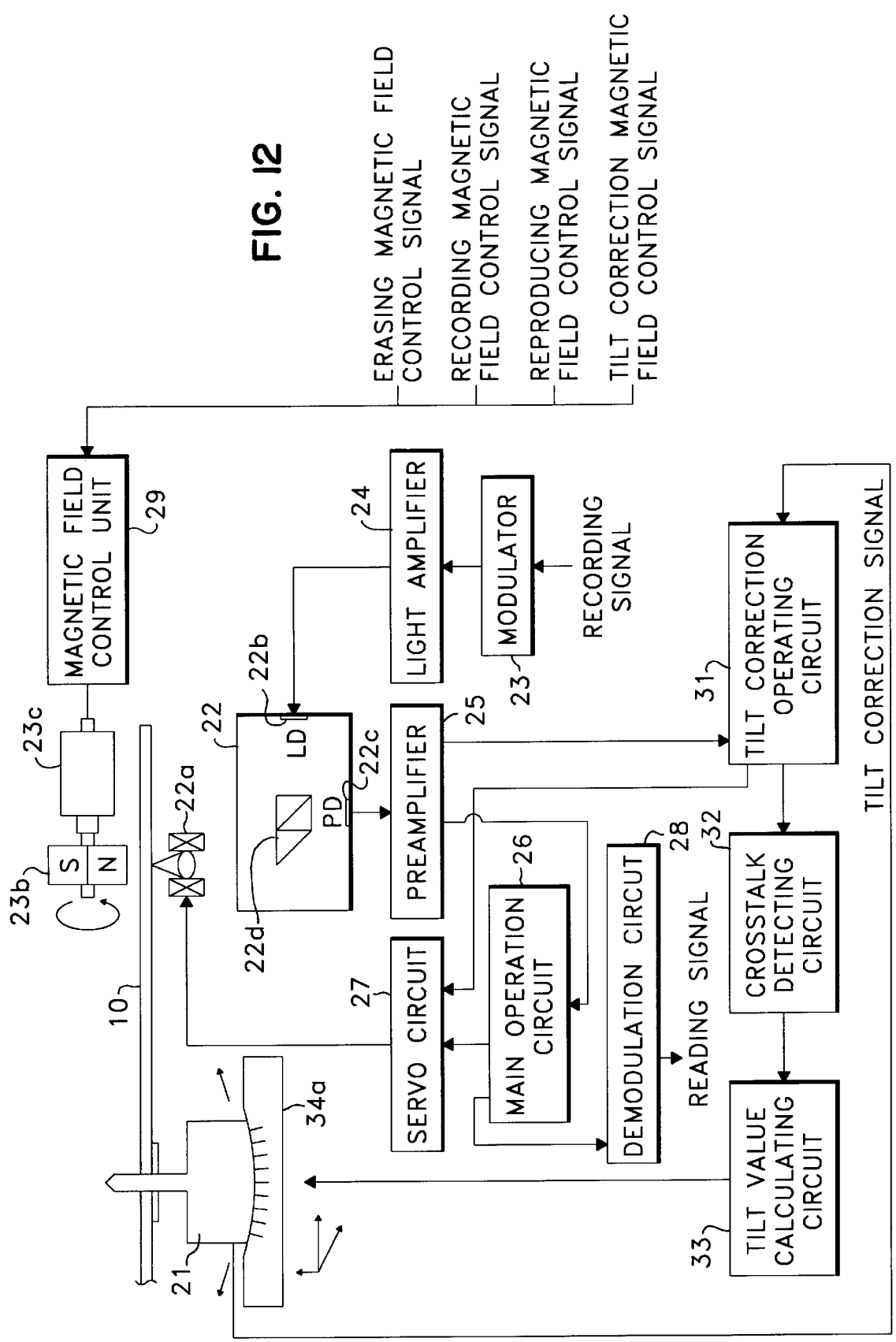
FIG. 12 is a block diagram showing the constitution of the magnet-optical recording and reproducing apparatus according to another embodiment of the present invention.

It can be seen from the above that, at each operating time of the magnet-optical disk 10, all the operations can be effectively performed when the absolute value of the magnetic field to be applied is 350 Oe. Based on this, for the above magnet-optical recording and reproducing apparatus a permanent magnet can be used in place of the electromagnet. FIG. 12 is a block diagram showing the constitution of a magnet-optical recording and reproducing apparatus of another embodiment of the present invention. The permanent magnet 23b can apply a magnetic field of 350 Oe to the magnet-optical disk 10 in the recording direction and erasing direction. The magnetic poles S, N are rotatably disposed so as to be brought near alternately relative to one surface of the magnet-optical disk 10. The permanent magnet 23b is connected to the motor 23c, and to the motor 23c a control signal from the magnetic field control part 29 can be inputted. Other constitutions are similar to those of the magnet-optical recording and reproducing apparatus shown in FIG. 1, and the same parts are indicated in the same marks, with explanation thereon omitted.

The magnetic field control part 29 controls the motor 23c so that the N pole of the permanent magnet 23b is brought near to the magnet-optical disk 10 when the erasing magnetic field control signal is inputted, S pole is brought near when the reproducing magnetic field control signal is inputted, N pole is brought near when the tilt correction magnetic field control signal is inputted, and S pole is brought near when the reproducing magnetic field control signal is inputted.

Accordingly, in this magnet-optical recording and reproducing apparatus, by carrying out tilt correction, the recording power margin of the magnet-optical disk 10 is enlarged to give sufficient amplitude of the reading signal of information. Furthermore, due to the use of permanent magnet, power consumption can be saved.

Figure 13:
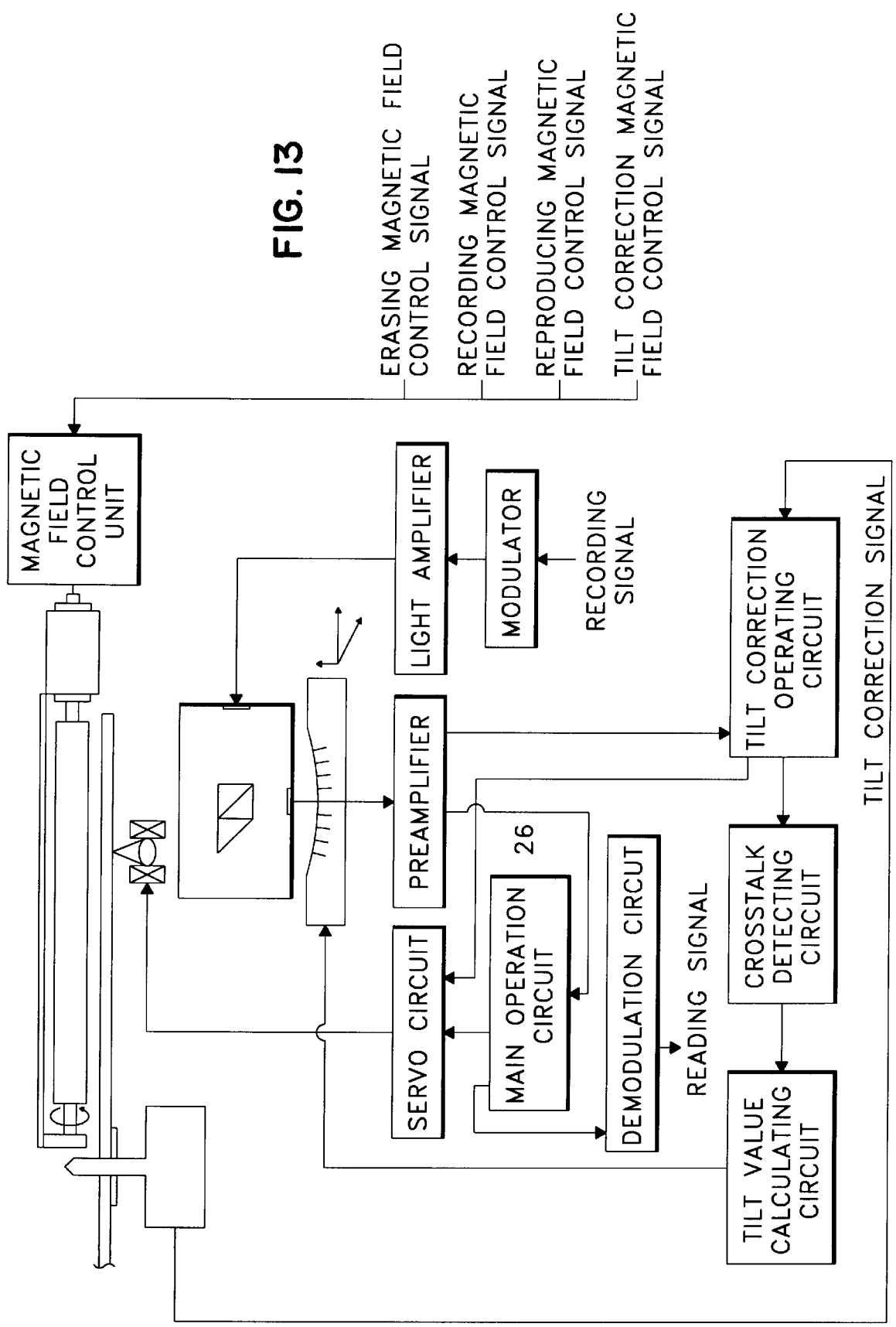
FIG. 13 is a block diagram showing the constitution of the magnet-optical recording and reproducing apparatus according to further embodiment of the present invention.

Furthermore, an example of using a permanent magnet 23d of different configuration is illustrated. FIG. 13 is a block diagram showing the constitution of a magnet-optical recording and reproducing apparatus of further embodiment of the present invention. The permanent magnet 23d has a configuration of a bar having approximately the same length as the radius of the magnet-optical disk 10, and is disposed to be rotatable so that the magnetic poles S and N are alternately brought near to one surface of the magnet-optical disk 10. The permanent magnet 23d is connected to the motor 23c, and to the motor 23c a control signal from the magnetic field control part 29 is allowed to be inputted. The optical head 22 is placed on the three dimensional moving table 34b, so that the inclination of the optical head 22 relative to the magnet-optical disk 10 is adjustable by the movement of the three dimensional moving table 34b. Other constitutions are similar to those of the magnet-optical recording and reproducing apparatus shown in FIG. 12, and the same parts are indicated in the same marks, with explanation thereon omitted.

In the magnet-optical recording and reproducing apparatus having the constitution as above, by correcting the tilt, the recording power margin of the magnet-optical disk 10 is enlarged and the reading signal amplitude of information can be sufficiently obtained. Furthermore, due to the use of a permanent magnet, power consumption can be saved, and as the permanent magnet has a length of approximately the same size as the radius of the magnet-optical disk 10, it need not be moved in the radial direction, and as no circuit for position control is necessary, power consumption can be further saved.

The crosstalk detection region 1 mentioned above is an exemplification, and it may be 3 or more tracks, and the formed patterns of the recording marks 1a, 1b are not limited thereto. Moreover, it is not essential to have an exclusive region as a crosstalk detection region but it may be so designed as to detect the crosstalk by reproducing the control data region.

As described above, in the present invention, it is possible to obtain a tilt and correct by detecting a crosstalk from the reading signal of the loaded magnet-optical readable medium, so that the recording power margin is enlarged in recording, and sufficient signal amplitude can be obtained in reproducing. Also, as it is possible to control the magnetic field to be applied during the respective operations of erasing, recording, tilt correcting, and reproducing by the magnetic field control part, the magnetic field suitable for each motion can be severally controlled. Furthermore, by applying the same absolute value for the magnetic field in each operation and using the permanent magnet, power consumption can be saved. Thus, the present invention shows excellent effects.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

|  | Composition | Dominant | Curie temperature (° C.) | Film thickness |
|---|---|---|---|---|
| substrate | Polycarbonate | — | — | 1.2 mm |
| dielectric film | SiN | — | — | 70 nm |
| reading layer | $Gd_{25.0}(Fe_{83.0}Co_{17.0})_{17.0}$ | TM | 280 | 40 nm |

TABLE 1-continued

| | Composition | Dominant | Curie temperature (° C.) | Film thickness |
|---|---|---|---|---|
| intermediate layer | $Gd_{31.0}(Fe_{94.0}Co_{6.0})_{69.0}$ | RE | 250 | 40 nm |
| recording layer | $Tb_{25.0}(Fe_{68.0}Co_{32.0})_{75.0}$ | TM | 310 | 50 nm |
| dielectric film | SiN | — | — | 70 nm |

TABLE 2

| | Sputtering gas | Sputtering pressure |
|---|---|---|
| dielectric film | $Ar:N_2 = 3:2$ | 0.4 Pa |
| recording layer | Ar | 0.8 Pa |
| intermediate layer | Ar | 0.8 Pa |
| reading layer | Ar | 0.8 Pa |
| dielectric film | $Ar:N_2 = 3:2$ | 0.4 Pa |

What is claimed is:

1. A magnet-optical reproducing apparatus for reading information and correcting tilt of a loaded magnet-optical readable medium relative to a light beam, comprising:
   a loading part to which the magnet-optical readable medium is loaded;
   a detecting part for detecting the loading of said magnet-optical readable medium to said loading part and instructing the tilt correction operation;
   an optical head for receiving the reflected light of the light beam irradiated on the magnet-optical readable medium and converting the received reflected light to an electric signal;
   a tilt correction operating circuit for determining a crosstalk detecting signal from the electric signal of said optical head on receipt of an instruction to perform the tilt correction operation;
   a crosstalk detecting circuit for detecting the crosstalk from said crosstalk detecting signal;
   a tilt value calculating circuit for obtaining a tilt value of the magnet-optical readable medium based on the detected crosstalk;
   a tilt correction part for correcting the tilt of the magnet-optical readable medium based on said tilt value; and
   a magnetic field application apparatus for applying a magnetic field controlled by a magnetic field control part at the time of reproducing of the magnet-optical readable medium,
   wherein said magnetic field control part controls the magnetic field to be applied to said magnet-optical readable medium when said tilt correction operation is instructed.

2. A magnet-optical reproducing apparatus according to claim 1, wherein said tilt correction part is a three-dimensional moving apparatus fit with said loading part and adapted to change the inclination of said magnet-optical readable medium relative to said optical head.

3. A magnet-optical reproducing apparatus according to claim 1, wherein said tilt correction part is a three-dimensional moving apparatus fit with said optical head and adapted to change the inclination of said optical head relative to said magnet-optical readable medium.

4. A magnet-optical reproducing apparatus according to claim 2, wherein said loading part has a convex surface on one side, said tilt correction part is a stage having a concave surface which can be engaged with the convex surface of said loading part, and said tilt correction part is fitted to said loading part and moves in the three-dimensional direction according to the tilt value calculated by said tilt value calculating circuit.

5. A magnet-optical recording and reproducing apparatus for carrying out recording, reading, and erasing of information of a magnet-optical readable medium, comprising:
   a loading part on which the magnet-optical readable medium is loaded;
   a detection part for detecting the loading of the magnet-optical readable medium on said loading part and instructing a tilt correction operation;
   an optical head for receiving the reflected light of a light beam irradiated on the magnet-optical readable medium and converting the received reflected light to an electric signal;
   a tilt correction operating circuit for determining a crosstalk detecting signal from the electric signal of said optical head on receipt of an instruction to perform the tilt correction operation;
   a crosstalk detecting circuit for detecting the crosstalk from said crosstalk detecting signal;
   a tilt value calculating circuit for obtaining a tilt value of the magnet-optical readable medium based on the detected crosstalk;
   a tilt correction part for correcting the tilt of the magnet-optical readable medium based on said tilt value; and
   a magnetic field application apparatus for applying a magnetic field controlled by a magnetic field control part at the time of recording, reproducing and erasing the information of the magnet-optical readable medium, respectively,
   wherein said magnetic field control part controls the magnetic field to be applied to said magnet-optical readable medium when said tilt correction operation is instructed.

6. A magnet-optical recording and reproducing apparatus according to claim 5, wherein the magnetic field application apparatus is provided with a permanent magnet.

* * * * *